United States Patent [19]

Wirth

[11] 4,331,994
[45] May 25, 1982

[54] SHOOTTHROUGH FAULT PROTECTION SYSTEM FOR A VOLTAGE SOURCE TRANSISTOR INVERTER

[75] Inventor: William F. Wirth, Ithaca, N.Y.

[73] Assignee: Borg-Warner Corporation, Chicago, Ill.

[21] Appl. No.: 79,853

[22] Filed: Sep. 28, 1979

[51] Int. Cl.³ .......................................... H02H 7/122
[52] U.S. Cl. ..................................... 361/56; 361/100; 363/127; 363/55; 363/34
[58] Field of Search ..................... 361/56, 57, 100, 93, 361/91; 363/55, 56, 57, 58, 34, 37, 98, 132, 123, 127; 307/252 M, 252 Q

[56] References Cited

U.S. PATENT DOCUMENTS

| | | | |
|---|---|---|---|
| 3,536,984 | 10/1970 | Rosenberry, Jr. | 363/58 |
| 3,702,962 | 11/1972 | Wohr et al. | 361/100 X |
| 3,947,748 | 3/1976 | Klein | 363/57 |
| 4,099,225 | 7/1978 | Nygaard | 363/132 X |
| 4,139,885 | 2/1979 | Overzet et al. | 363/58 |

Primary Examiner—Patrick R. Salce
Attorney, Agent, or Firm—James E. Tracy

[57] ABSTRACT

Faulted transistors in a voltage source transistor inverter are protected against shootthrough fault current, from the filter capacitor of the d-c voltage source which drives the inverter over a d-c bus, by interposing a small choke in series with the filter capacitor to limit the rate of rise of that fault current. At the same time and in response to a shootthrough fault, a pre-charged capacitor, included in a crowbar circuit connected across the d-c bus, discharges through the faulted transistors in a direction opposite to the fault current in order to effect fast turn-off of the transistors, thereby preventing damage thereto.

1 Claim, 3 Drawing Figures

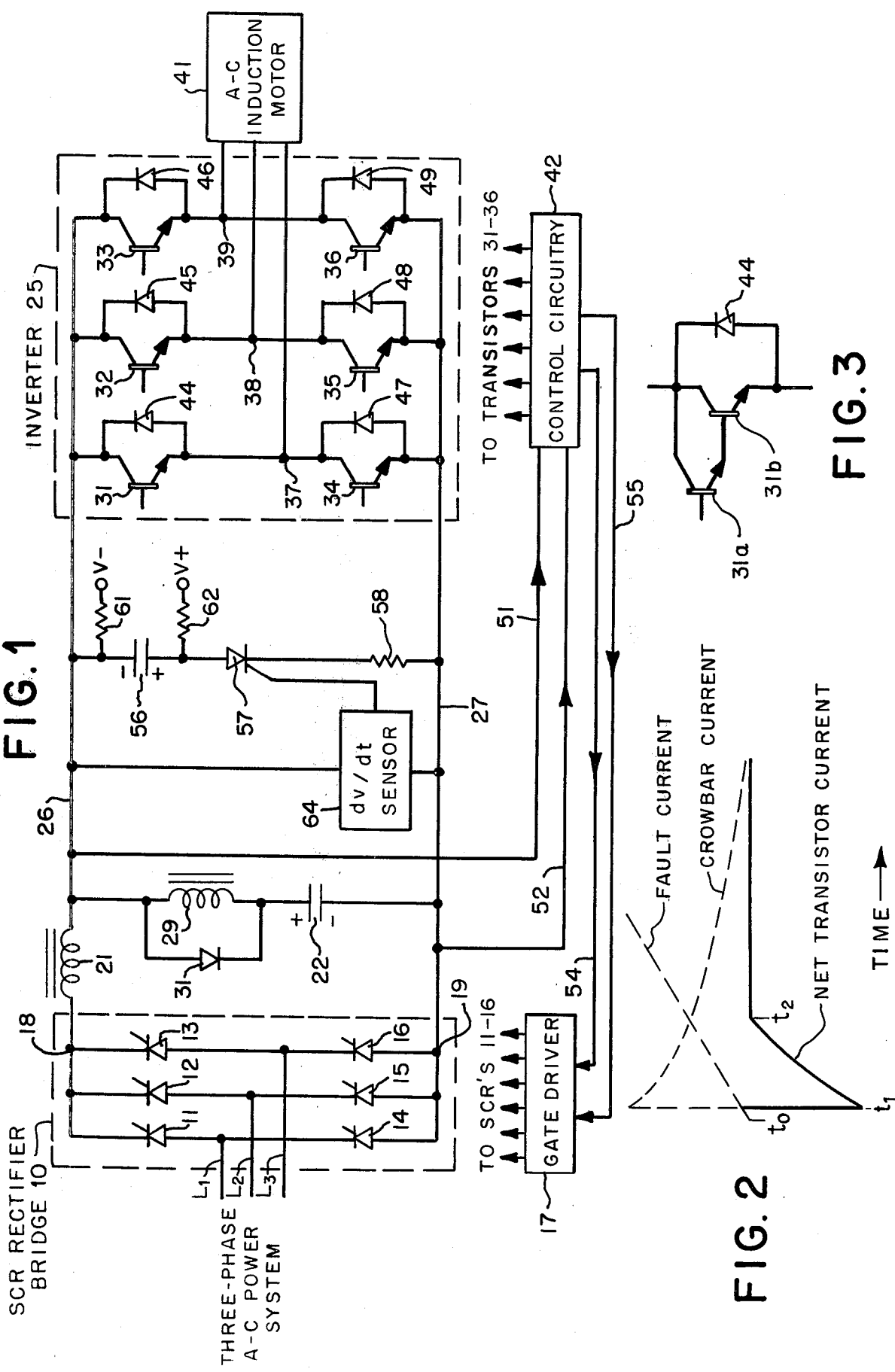

SHOOTTHROUGH FAULT PROTECTION SYSTEM FOR A VOLTAGE SOURCE TRANSISTOR INVERTER

BACKGROUND OF THE INVENTION

This invention relates to a protection system for preventing the destruction of transistors in a voltage source transistor inverter in the event of a shootthrough fault or an output short circuit.

In a typical voltage source transistor inverter at least two pairs of power bipolar transistors are series-connected across the d-c bus over which a d-c voltage is received from a d-c voltage source. The circuit junction of each pair of transistors connects to a load, such as an induction motor. By switching the transistors on and off (namely, between saturation and cutoff) in a predetermined sequence the d-c voltage is effectively converted to a-c voltage for application to the load. For example, when the inverter includes three pairs of bipolar transistors (which may be power darlingtons) the inverter output voltage will exhibit a six-step waveshape to approximate a sine wave.

Under normal conditions, a series-connected pair of transistors will never be turned on at the same time by the control circuitry for the inverter. Unfortunately, however, a transistor can be inadvertently switched on, such as by noise, when it should be non-conductive, and if the inadvertently triggered transistor is conductive at the same time that the other transistor in the pair is turned on by the control circuitry, essentially a short circuit will be created across the d-c bus through the emitter-collector conduction paths of the two faulted transistors. The shunt-connected filter capacitor of the d-c voltage source thereupon discharges and, in the absence of some protection arrangement, would destroy at least one of the two transistors within a few microseconds. This is commonly referred to as a "shootthrough fault." To appreciate the magnitude of this fault current, in a 20 horsepower inverter drive, for example, the filter capacitor (which may actually comprise a series of separate parallel-connected capacitors) may typically have a capacitance of 13,200 microfarads and the d-c voltage on the d-c bus, and therefore across the filter capacitor, may be around 300 volts. If there is a shootthrough fault which short circuits the d-c bus, a peak fault current of up to 10,000 amperes could flow through the two conducting faulted transistors, the fault current being limited only by the filter capacitor's effective series resistance.

To overcome this problem, shootthrough fault protection schemes have been developed. A well-known prior arrangement provides a crowbar circuit, consisting of an SCR, across the d-c bus. When a shootthrough fault occurs, the SCR is fired into conduction to divert the fault current from the transistors to the SCR which has considerably better surge characteristics. However, since the SCR has a higher voltage drop (greater than one volt) than the two series transistors (0.3 volt + 0.3 volt or 0.6 volt) some of the fault current still passes through the transistors and they are not completely protected. Also since the SCR must discharge the filter capacitor it has to have a large I²T rating.

The shootthrough fault protection system of the present invention constitutes a significant improvement over those previously developed, especially over the prior arrangement described hereinbefore, achieving much greater protection of the transistors and yet being considerably less expensive in construction.

SUMMARY OF THE INVENTION

The shootthrough fault protection system of the invention protects the transistors of a voltage source transistor inverter against shootthrough fault current flowing through faulted transistors from the filter capacitor of the d-c voltage source which drives the inverter. The protection system comprises limiting means, such as a choke in series with the filter capacitor, for limiting the rate of increase of any shootthrough fault current. Protection means, which respond to a shootthrough fault, are provided for translating reverse current through the faulted transistors in opposition to, and thereby neutralizing, the shootthrough fault current to effect fast turn-off of the transistors to prevent destruction thereof.

DESCRIPTION OF THE DRAWING

The features of the invention which are believed to be novel are set forth with particularity in the appended claims. The invention, together with further advantages and features thereof, may best be understood, however, by reference to the following description in conjunction with the accompanying drawing in which:

FIG. 1 schematically illustrates a shootthrough fault protection system, constructed in accordance with the invention, and the manner in which that system is coupled to a voltage source transistor inverter to effect protection thereof;

FIG. 2 depicts various current signal waveforms that will be helpful in understanding the operation of the fault protection system; and FIG. 3 illustrates a modified form of the transistors included in the inverter in FIG. 1.

DESCRIPTION OF THE ILLUSTRATED EMBODIMENT

Line conductors $L_1$, $L_2$ and $L_3$ connect to a conventional three-phase a-c power system and thus provide three-phase a-c voltage, namely three alternating voltages that are phase-displaced with respect to each other by 120° and have a commutating frequency of 60 hertz. Each of the three phase voltages is a line-to-line voltage and appears on one of the line conductors $L_1$, $L_2$ and $L_3$ relative to another one of the line conductors. The amplitude of each phase voltage may take any appropriate value depending on the characteristics of the load to be energized. The a-c energy received over the line conductors is converted to d-c power by phase-controlled SCR rectifier bridge 10 which is of well-known construction. Specifically, the bridge has a family of six silicon controlled rectifiers or SCR's 11–16 which, when fired into conduction by gate current from gate driver 17, rectify the applied a-c voltage and develop across the bridge's positive and negative output terminals (designated 18 and 19, respectively) rectified voltage of a magnitude determined by the conduction angles of the SCR's during each half cycle of the applied a-c voltage.

To explain, each SCR in bridge 10 can conduct, during each positive polarity half cycle of the voltage applied thereto from the a-c power system, when the SCR's anode is positive relative to its cathode. However, conduction will not occur during a positive half cycle until gate current is supplied to the SCR's gate from gate driver 17. At that instant, the SCR fires into conduction, or turns on, and permits load current to flow therethrough until the end of the positive half cycle. The greater the phase angle or time delay between the start of a positive half cycle and the firing of the SCR into conduction, the less the conduction angle and the less alternating current that will be rectified and supplied to the load, thereby providing less rectified voltage across output terminals 18 and 19 of the SCR rectifier bridge. Of course, this rectified voltage will be of positive polarity at terminal 18 with respect to terminal 19.

Filter choke 21 and filter capacitor 22 filter the rectified voltage from the bridge to provide a filtered d-c voltage of a magnitude, for example, of 300 volts for application to inverter 25 over the d-c bus provided by lines 26 and 27. It will be assumed, by way of example, that inverter 25 provides a 20 horsepower drive, namely it is capable of driving a 20 horsepower load. By controlling the conduction angles of SCR's 11-16 the d-c voltage applied to inverter 25 is controlled. Hence, rectifier bridge 10, filter choke 21 and filter capacitor 22 constitute a controllable voltage source for the inverter. In a current source inverter, the current supplied to the inverter is controlled and no filter capacitor (similar to capacitor 22) is employed. As will be appreciated, capacitor 22 causes the shootthrough fault problem which is overcome with the present invention. For that reason, the invention is applicable to voltage source inverters.

The purpose of choke 29 and the parallel-connected diode 31 will be explained later. Suffice it to say at this point that the choke is relatively small, preferably having an inductance of around 8 microhenries, and thus has a minimal effect on the filtering capability of the filter circuit 21, 22. In other words, no significant ripple component will be introduced into the d-c voltage on the d-c bus 26, 27 because of the presence of choke 29.

Inverter 25 has a well-known circuit configuration. It includes three pairs of NPN bipolar power transistors 31-36, each pair being series-connected across the d-c bus 26, 27. The circuit junctions 37, 38 and 39 of the three transistor pairs connect to the windings of a-c induction motor 41. By supplying drive current to the bases of the six bipolar transistors 31-36 at prescribed times, the d-c voltage across the d-c bus is effectively changed to a-c voltage as applied to the windings of the motor, thereby delivering alternating current to the windings. For example, if base drive current is simultaneously supplied to transistors 31 and 35 to drive those transistors into their saturation modes, current will flow from positive line 26 and through, in the order named, the emitter-collector conduction path of transistor 31, junction 37, a winding of motor 41, junction 38 and the emitter-collector conduction path of transistor 35 to negative line 27. If transistors 31 and 35 are then cutoff and transistors 32 and 34 are turned on instead, current will flow through the same motor winding in the opposite direction. Of course, control circuitry (shown in FIG. 1 by block 42) for switching the transistors 31-36 on and off in the correct sequence and at the correct times in order to provide a-c energy for rotating the motor is well understood by those skilled in the art.

Diode 31, shunting choke 29, clamps the d-c bus to the filter capacitor voltage, thereby preventing the bus from overshooting when the transistors in the inverter are switched on and off.

The emitter-collector conduction path of each of the six power transistors 31-36 is shunted by a respective one of a series of six oppositely poled feedback diodes 44-49 which are employed to circulate the motor reactive current back to filter capacitor 22. Feedback diodes 44-49 are also effective to clamp the motor terminal voltage so that it will never exceed the d-c bus voltage.

Although not shown in the drawing, preferably each of transistors 31-36 will also be shunted by a conventional snubber network to prevent the inductive energy in the load from damaging the transistor when it is switched off by circuitry 42 during normal operation.

While each of power transistors 31-36 is illustrated in FIG. 1 as a conventional NPN transistor (to simplify the drawing), in reality it would preferably take the form of a power darlington transistor, as shown in FIG. 3. By way of example, the form that transistor 31 would take is illustrated in FIG. 3, but, of course, the other five transistors in the inverter would be of similar construction. In the darlington arrangement, transistor 31 comprises a combination of two transistors 31a and 31b, while still having only three connections, namely base, emitter and collector connections as in the case of transistor 31 in FIG. 1. In practice, transistors 31a and 31b and diode 44 would preferably all be integrated into the same chip.

Under the control of circuitry 42 programmed base drive current is supplied to transistors 31-36, as a result of which inverter 25 applies a-c voltage to motor 41 of a magnitude directly proportional to the amplitude of the d-c bus voltage. The frequency of the inverter output voltage is established by the frequency of the driving signals applied to the bases of transistors 31-36 from control circuitry 42. In well-known fashion, this frequency may be correlated with and determined by the d-c bus voltage by means of a voltage controlled oscillator, included in circuitry 42, which operates in response to the d-c bus voltage received over lines 51 and 52. The frequency of the oscillator is determined by the d-c bus voltage and varies directly therewith, thereby maintaining substantially constant the ratio of amplitude to frequency of the a-c voltage developed by inverter 25. The speed at which motor 41 will be rotated is determined by and is directly proportional to the inverter frequency. Although not shown, the shaft of motor 41 will drive some mechanical load. By maintaining a fixed ratio of the amplitude of the inverter output voltage relative to its frequency, motor 41 will have a constant torque output capability regardless of motor speed.

To adjust the motor speed, the operation of SCR's 11-16 may be controlled in well-known manner by control circuitry 42 and gate driver 17 to establish the d-c bus voltage at a selected desired amplitude level to regulate the current flow to inverter 25 and motor 41. For example, a reference voltage, representing the desired d-c bus voltage required to drive the motor at the selected speed, may be provided in circuitry 42 and this reference voltage is compared with the actual d-c bus voltage to produce an error signal, on lines 54 and 55, which varies as a function of the difference between the desired d-c magnitude (represented by the reference voltage) and the actual magnitude of the d-c bus voltage being fed to the inverter. In a fashion well understood in the art, gate driver 17 responds to that error signal to produce properly timed gate current pulses for application to the gates of SCR's 11-16 in order to control the conduction angles as required to establish the d-c bus voltage across lines 26 and 27 at the magnitude necessary to drive motor 41 at the selected speed. If the d-c magnitude tends to decrease, for example, from the required level (thereby tending to decrease the motor speed), the error signal changes and causes gate driver 17 to increase the conduction angles, thereby increasing the d-c bus voltage until the correct amplitude level is re-established. Assuming that a different speed is preferred, for example a lower speed, the reference voltage may be changed (such as by manually adjusting a potentiometer) so that the error signal will cause gate driver 17 to decrease the conduction angles of SCR's 11–16 sufficiently to lower the d-c bus voltage applied to the inverter down to the level necessary to drive motor 41 at the new desired lower speed.

Of course, while the motor speed may be changed by a manual adjustment, the reference voltage may be derived by sensing some parameter or characteristic of the system, in which the inverter drive of FIG. 1 is incorporated, in order to automatically control the motor speed in response to that sensed information.

It is also to be understood that there are many arrangements to control an inverter and its associated rectifier bridge to regulate the operation of some load and, as will be appreciated, the invention is applicable to all of those arrangements. Moreover, it will be recognized that the d-c power supply may operate in response to single-phase rather than three-phase a-c energy. In the single-phase environment, line conductor $L_3$ and SCR's 13 and 16 would be omitted. A d-c bus voltage of positive polarity will still be produced on line 26 with respect to line 27.

Turning now to the invention, shootthrough fault protection is achieved with the previously described choke 29 and with the crowbar circuit connected across the d-c bus 26, 27 and which includes in series a crowbar capacitor 56, a solid state switch in the form of SCR 57 and a current limiting resistor 58. Preferably, capacitor 56 will have a capacitance of 20 microfarads and resistor 58 will have a resistance of one ohm. Normally, and in the absence of a shootthrough fault, SCR 57 will remain non-conductive so that the crowbar circuit will be ineffective. Meanwhile, crowbar capacitor 56 will be pre-charged with a polarity opposite to that of filter capacitor 22. In other words, the positively-charged side of capacitor 22 is adjacent positive line 26, whereas the negatively-charged side of capacitor 56 is adjacent to the positive line. In effect, capacitor 56 is charged backwards against the d-c bus. Establishing and holding capacitor 56 in its normal opposite polarity charge condition, prior to the occurrence of a shootthrough fault, is accomplished by a separate charging circuit including resistors 61 and 62 (each of which may be 10 Kohms) and voltage source V which may be 300 volts d-c. In this way, capacitor 56 will normally be charged to 300 volts with the polarity indicated in FIG. 1, while capacitor 22 will also normally be charged to 300 volts (namely, the bus voltage) but with an opposite polarity as shown in FIG. 1. Of course, it is not essential that the charge on the crowbar capacitor 56 be equal to the d-c bus voltage. It is preferred, however, for reasons which will become apparent.

In normal operation, none of transistors 31–36 will be turned on when its associated series-connected transistor is also conducting. However, if one of the transistors in a pair is inadvertently triggered into conduction (such as by noise or by heat) when the other transistor in the pair is rendered conductive by control circuitry 42 (or if both transistors in a pair are turned on simultaneously by noise or by some other cause) essentially a short circuit will exist across d-c bus 26, 27, creating a shootthrough fault condition since filter capacitor 22 will attempt to discharge through the short circuit.

Assume, for example, that transistors 31 and 34 are inadvertently conductive at the same time. They may thus be referred to as "faulted transistors" even though one may have been turned on by control circuitry 42. At the instant the fault occurs, the d-c bus voltage drops to practically zero (since the d-c bus is essentially shorted) and the entire 300 volts on capacitor 22 instantaneously appears across choke 29 which prevents the capacitor from discharging instantaneously. If the inductance of the choke is eight microhenries, as previously suggested, then with formula $E = L\, di/dt$ it is possible to determine the extent to which the capacitor discharge current, or fault current, passing through the faulted transistors 31 and 34 has been slowed down by the presence of choke 29. Specifically, with the preferred circuit parameters it is found that the time rate of change of the fault current flowing from filter capacitor 22 will be 37 amperes per microsecond. Hence, by employing the small choke 29 the rate of increase or rise of the shootthrough fault current is limited, causing the current to increase linearly along a ramp or slope function as illustrated by the current waveform in FIG. 2 labeled "fault current." In the absence of choke 29, the fault current would increase almost instantaneously to an extremely high amplitude.

In FIG. 2, time $t_0$ indicates the initiation of the shootthrough fault and as the fault current begins to increase it will flow through the emitter-collector conduction path of each of transistors 31 and 34 in the direction from the collector to the emitter. Between times $t_0$ and $t_1$ (less than one microsecond) dv/dt sensing device 64, which monitors the time rate of change of the d-c bus voltage, detects when that voltage suddenly drops to essentially zero. In response to that voltage change, sensor 64 fires SCR 57 into conduction at time $t_1$. Of course, the time interval $t_0$–$t_1$ is merely the detection delay. At the instant $t_1$ that SCR 57 is triggered, reverse current is translated through the faulted transistors 31 and 34 in opposition to, and thereby to neutralize, the shootthrough fault current to effect fast turn-off of those transistors to prevent destruction thereof.

To elucidate, when SCR 57 conducts, the crowbar circuit will be connected across the d-c bus and therefore in shunt with the faulted transistors, as a consequence of which the crowbar capacitor 56, being charged up to 300 volts but of opposite polarity to the change on capacitor 22, discharges rapidly or "dumps" through transistors 31 and 34 in a direction opposite to the fault current, the high amplitude crowbar current therefore flowing through each transistor from the emitter to the collector. The instantaneous amplitude of the crowbar current, with capacitor 56 charged to 300 volts and with resistor 58 having a resistance of one ohm, will therefore be 300 amperes at time $t_1$. This is much greater than the fault current with the result that the net transistor current (the fault current being substracted from the crowbar current) will be reverse current, as shown by the appropriately labeled waveform in FIG. 2.

Between times $t_1$ and $t_2$ the crowbar current will be decreasing exponentially while the fault current is increasing along the ramp function, the net transistor current decreasing toward zero and flowing in the direction from emitter to collector. Reverse current through a bipolar power transistor is possible because of its charge storage characteristic. When a transistor is established in its saturation mode by base drive current (as is the case at time $t_0$), minority carriers become stored in the base and collector regions and these carriers must be swept away, such as by recombination or absorption, after the termination of the base current before the transistor switches out of its saturation mode and turns off. This process of sweeping out the minority carriers requires a finite time interval which is referred to as the "storage time." The reverse current, or net transistor current, flowing through transistors 31 and 34 immediately after time $t_1$ is effectively reverse recovery current which sweeps out the minority carriers and effects fast turn-off of the transistors to prevent damage thereto. During this time some of the reverse recovery current may be flowing through the shunting feedback diodes 44 and 47.

After all of the minority carriers are swept away and transistors 31 and 34 turn off, which will occur at some point between times $t_1$ and $t_2$, all of the decreasing net transistor current (crowbar current minus the fault current) moves over to the feedback diodes 44 and 47. When the opposing fault and crowbar currents are equal, which occurs at time $t_2$, the net transistor current reduces to zero, as shown in FIG. 2, and the feedback diodes cease conducting, assuming that the diodes are of the fast recovery type. When the transistor current becomes zero at time $t_2$, the d-c bus voltage returns to 300 volts. Subsequent to time $t_2$ the fault current flowing out of capacitor 22 is greater than the exponentially decaying crowbar current from capacitor 56, as a result of which all of the fault current will now flow through the crowbar circuit and crowbar capacitor 56 will recharge to the d-c bus voltage but with the same polarity as filter capacitor 22, namely the side of capacitor 56 adjacent to positive line 26 will be positively charged relative to its other side which is adjacent to the anode of SCR 57. As capacitor 56 builds up its charge, the current through the crowbar circuit decreases and drops below the SCR holding current, whereupon SCR 57 turns off and disconnects the crowbar circuit from shunting the d-c bus. If desired, the system in which the invention is incorporated may be shut down upon the occurrence of a shootthrough fault, requiring a manual restart. In any event, however, voltage source V and resistors 61 and 62 will provide capacitor 56 with its normal charge condition, with the polarity indicated in the drawing, so that it is in readiness for any subsequent shootthrough fault.

It will be apparent that the invention is also useful in protecting the transistors in the event of an output short circuit, namely a short across the output of the inverter. Assume, for example, that circuit junctions or output terminals 37 and 38 are shorted together at a time when transistors 32 and 34 are turned on by control circuitry 42 during normal operation of the inverter. Under those conditions, transistors 32 and 34 would provide essentially a short circuit across the d-c bus and would therefore be faulted. These transistors would be protected against damage, however, by the protection system of the invention which would operate in the same manner as described.

Among the many advantages of the invention, the faulted transistors turn off much faster than in the prior systems due to the reverse current and voltage, thereby providing substantially greater and more complete protection. Moreover, SCR 57 may be relatively small and inexpensive since it has to carry only a single surge of current for less than 100 microseconds. The SCR current quickly dies down to zero because of the series-connected crowbar capacitor. Heat sinking is not even required. In the prior arrangements, a crowbar SCR that would divert the fault current had to be sized to handle the entire charge from the filter capacitor. In addition, second breakdown damage is avoided in the present invention because a faulted transistor is held at a small voltage drop (one diode drop) until it is turned off. With the arrangement of the invention, a transistor is never turned off to a high bus voltage when high magnitude current is flowing through the transistor, as is done in prior arrangements and which causes second breakdown damage.

While a particular embodiment of the invention has been shown and described, modifications may be made, and it is intended in the appended claims to cover all such modifications as may fall within the true spirit and scope of the invention.

I claim:

1. A shootthrough fault protection system for a voltage source transistor inverter which is driven by a d-c bus voltage received over a d-c bus, having positive and negative lines, from a d-c voltage source having a filter capacitor shunt-connected across the d-c bus, where the inverter includes, series-connected across the d-c bus, at least one pair of power bipolar transistors which are subject to undesired shootthrough fault current caused by the discharging of the filter capacitor through the emitter-collector conduction paths of the transistors whenever the transistors are faulted and are inadvertently conductive at the same time thereby short-circuiting the d-c bus, said protection system comprising:

a choke, interposed in series with the filter capacitor between the positive and negative lines of the d-c bus and therefore normally translating only the capacitor ripple current, for limiting the rate of increase of any shootthrough fault current and causing the fault current to increase linearly along a ramp function;

a crowbar circuit shunt-connected across the d-c bus and having a crowbar capacitor and a series-connected SCR;

means for normally changing said crowbar capacitor with a charge of opposite polarity to the charge on the filter capacitor, the positively-charged side of the filter capacitor being adjacent to the positive line of the d-c bus, while the negatively-charged side of the crowbar capacitor is adjacent to the positive line;

and control means, responsive to a shootthrough fault, for firing said SCR into conduction and discharging said crowbar capacitor to translate high amplitude crowbar current through the faulted transistors in a direction opposite to the fault current from the filter capacitor, the instantaneous amplitude of the crowbar current, at the beginning of a shootthrough fault, being much greater than that of the fault current, thereby producing high amplitude reverse recovery current flow through the faulted transistors which sweeps out the minority carriers and effects fast turn-off of the transistors to prevent the destruction thereof, the crowbar current thereafter decreasing exponentially while the fault current is increasing linearly along a ramp function until the opposing crowbar and fault currents are equal at which time the net transistor current becomes zero, after which the subsequent fault and crowbar currents will both flow through said crowbar circuit in the same direction and will re-charge said crowbar capacitor with the same polarity as the filter capacitor, the emitter-collector conduction path of each of the transistors being shunted by an oppositely poled feedback diode which conducts the decreasing net transistor current after the minority carriers are swept away and the transistor is turned off.

* * * * *